United States Patent [19]

Cataldo et al.

[11] Patent Number: 4,981,101
[45] Date of Patent: Jan. 1, 1991

[54] VIBRATORY ARTICLE COATER

[76] Inventors: Ronald J. Cataldo, 36 Chipman St., Medford, Mass. 02155; Thomas F. Mullins, III, 16 Meadowlark Way, Billerica, Mass. 01821

[21] Appl. No.: 296,181
[22] Filed: Jan. 11, 1989
[51] Int. Cl.$^5$ ............................ A23G 3/26; B05C 3/05
[52] U.S. Cl. ....................................... 118/19; 118/22; 118/57; 118/417
[58] Field of Search ...................... 118/19, 22, 57, 417; 427/184, 242, 212, 346, 57

[56] References Cited

U.S. PATENT DOCUMENTS

| | | | |
|---|---|---|---|
| 3,024,133 | 3/1962 | White | 427/346 |
| 3,113,884 | 12/1963 | Kohler | 118/410 X |
| 3,965,858 | 6/1976 | Burdin | 118/417 |
| 4,000,338 | 12/1976 | Burdin | 427/184 |
| 4,063,564 | 12/1977 | Francis | 134/66 |
| 4,545,321 | 10/1985 | Bassa | 118/410 X |

FOREIGN PATENT DOCUMENTS 2459010  2/1981  France ................... 118/22

*Primary Examiner*—Evan Lawrence
*Attorney, Agent, or Firm*—Lahive & Cockfield

[57] ABSTRACT

A vibratory coating apparatus may be used to coat articles, such as chocolate pieces, with discrete coating materials. The coating apparatus features a feed bowl assembly with an attached ramp system. The feed bowl and ramp system are mounted upon a vibratory drive assembly which imparts a vibratory motion, at a predetermined frequency, to the bowl and ramp system. The vibratory motion causes agitation of the chocolate pieces and coatings, and causes the coated chocolates and loose coatings to migrate up the ramp system and out of the coating apparatus. The chocolate pieces are conveyed along a first inclined ramp from the bottom surface of the feed bowl to a location outside the bowl. A second inclined ramp receives loose coating material from a downstream location of the first ramp and redeposits the coating material both at an upstream location of the first ramp separate from the bowl and within the bowl.

17 Claims, 3 Drawing Sheets

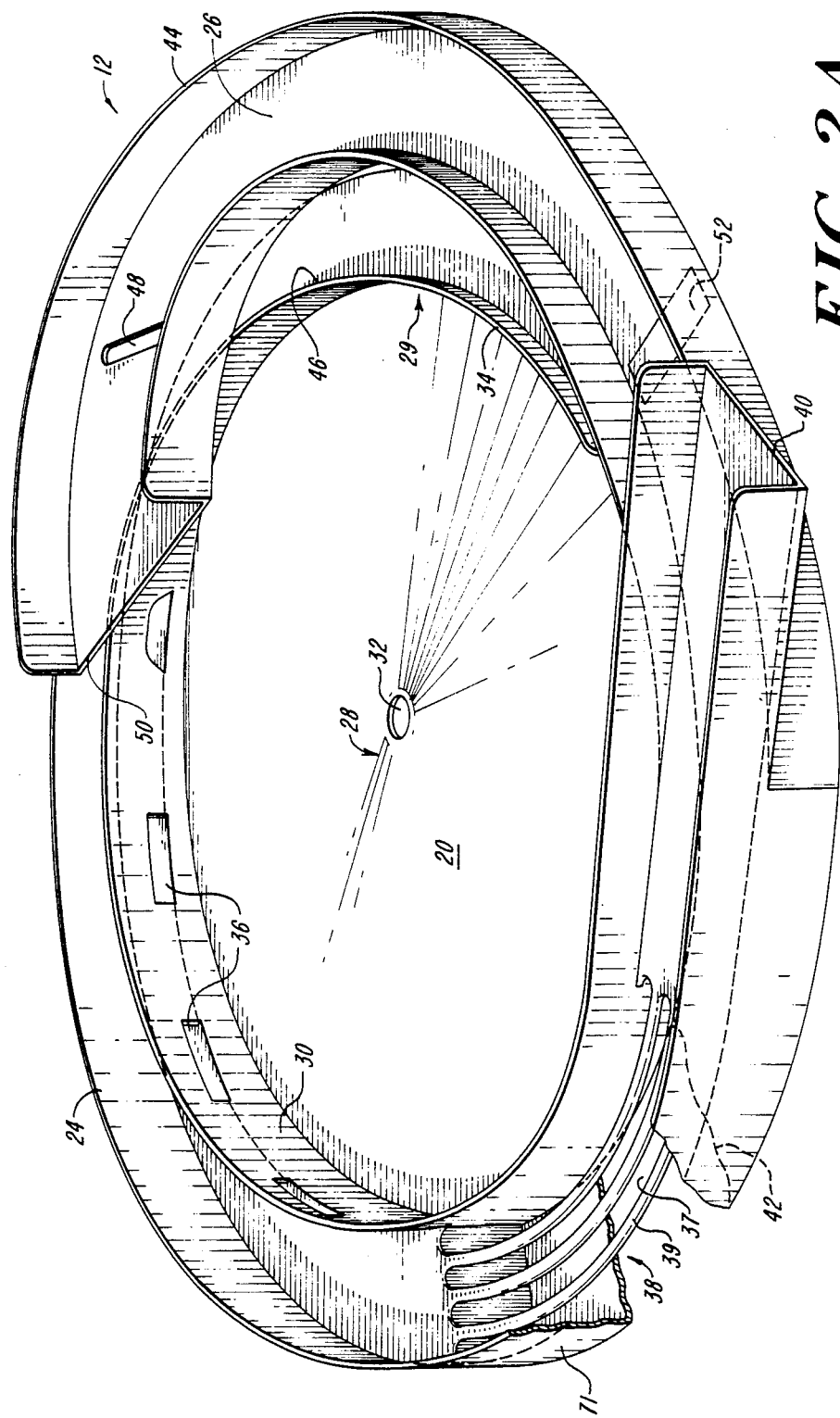

VIBRATORY ARTICLE COATER

BACKGROUND OF THE INVENTION

The present invention relates to an apparatus for coating articles with a coating material. More particularly, the invention relates to a vibratory apparatus for the coating of articles, such as candy pieces, with discrete coating materials.

In the field of candy manufacturing it is often necessary to coat candy pieces, such as chocolates, with discrete coating materials such as nuts, coconut shavings, jimmies, etc. Presently, there is not believed to be a versatile, inexpensive apparatus which may be used by candy manufacturers to effectively coat such articles. In fact, many such coating operations are performed by hand. Hand coating operations are not desirable due to the shortages of economical labor and because such procedures are unduly time consuming.

It is accordingly an object of the invention to provide a method and apparatus for coating candy pieces with discrete coating materials. A further object of the invention is to provide a coating apparatus which may easily and economically be used with existing candy manufacturing processes and apparatuses. Another object of the invention is to provide an apparatus for crating candy pieces and the like in an efficient and rapid manner. These and other objects of the invention will be apparent to those of ordinary skill in the art upon reading the following disclosure.

SUMMARY OF THE INVENTION

The present invention comprises a vibratory apparatus for coating articles with a coating material. Exemplary articles to be coated include chocolates and other candy pieces, while coating materials are preferably discrete coatings such as coconut shavings, nuts, jimmies, and the like. The terms "chocolates" or "candy pieces" may be used herein to denote articles to be coated, however, it is understood that the invention is not limited to coating only chocolates or other candy pieces.

The vibratory coating apparatus of the present invention comprises a coater plate which is adapted to be mounted upon a vibratory drive assembly, or base unit. The coater plate features a feed bowl which retains the articles to be coated as well as the coating materials. The feed bowl undergoes vibration, at a predetermined frequency, when the base unit is activated, enabling the chocolates to be coated with coating materials.

The apparatus also includes a first inclined ramp which is appended to and disposed about the perimeter of the feed bowl. The first ramp originates within the feed bowl and terminates above the feed bowl (and just beyond the perimeter thereof) after slightly less than a full revolution about the perimeter of the feed bowl. The first ramp is adapted to receive coated chocolate pieces and loose coatings at its origin within the feed bowl, and to convey the chocolate pieces out of the apparatus for downstream processing.

A second inclined ramp means is also appended to the feed bowl. The second ramp originates beneath the first ramp, but does not directly communicate with the feed bowl. From its point of origin beneath an end portion of the first ramp, the second ramp extends about the perimeter of the feed bowl for slightly more than one-half revolution. Approximately the first half of the second ramp is overlapped by the first ramp while the second half of the second ramp partially overlaps the first ramp. The terminal end of the second ramp is disposed over an interior portion of the feed bowl. The second ramp functions to receive loose coating materials from the first ramp and to deposit these materials both at an upstream location of the first ramp and within an interior portion of the bowl means.

The coater plate is, as noted above, mounted to a vibratory drive assembly which, when activated, vibrates the feed bowl and ramp system at a frequency of between 40 and 150 cycles per second, and preferably at approximately 50 to 60 cycles per second. This vibration results in agitation of the feed bowl and its contents such that the coating materials contact and become adhered to the chocolate pieces. Continued vibration results in the migration of coated chocolates and loose coating materials to the outside edges of the feed bowl. Eventually, the coated chocolates as well as loose coating materials enter the first ramp and migrate up the ramp. Coated chocolate materials follow the entire pathway of the first ramp and exit the coater apparatus. Loose coating materials initially follow the pathway of the first ramp, but eventually pass through holes in the first ramp to become redeposited either within the interior of the feeder bowl or on the second ramp. Those materials deposited on the second ramp proceed up the second ramp and may be redeposited either on the first ramp, at a downstream location thereof, or within the interior of the feeder bowl.

BRIEF DESCRIPTION OF THE DRAWINGS

FIG. 2A is a perspective view of the coater plate component of the present invention.

DETAILED DESCRIPTION OF THE INVENTION

Figure 1:
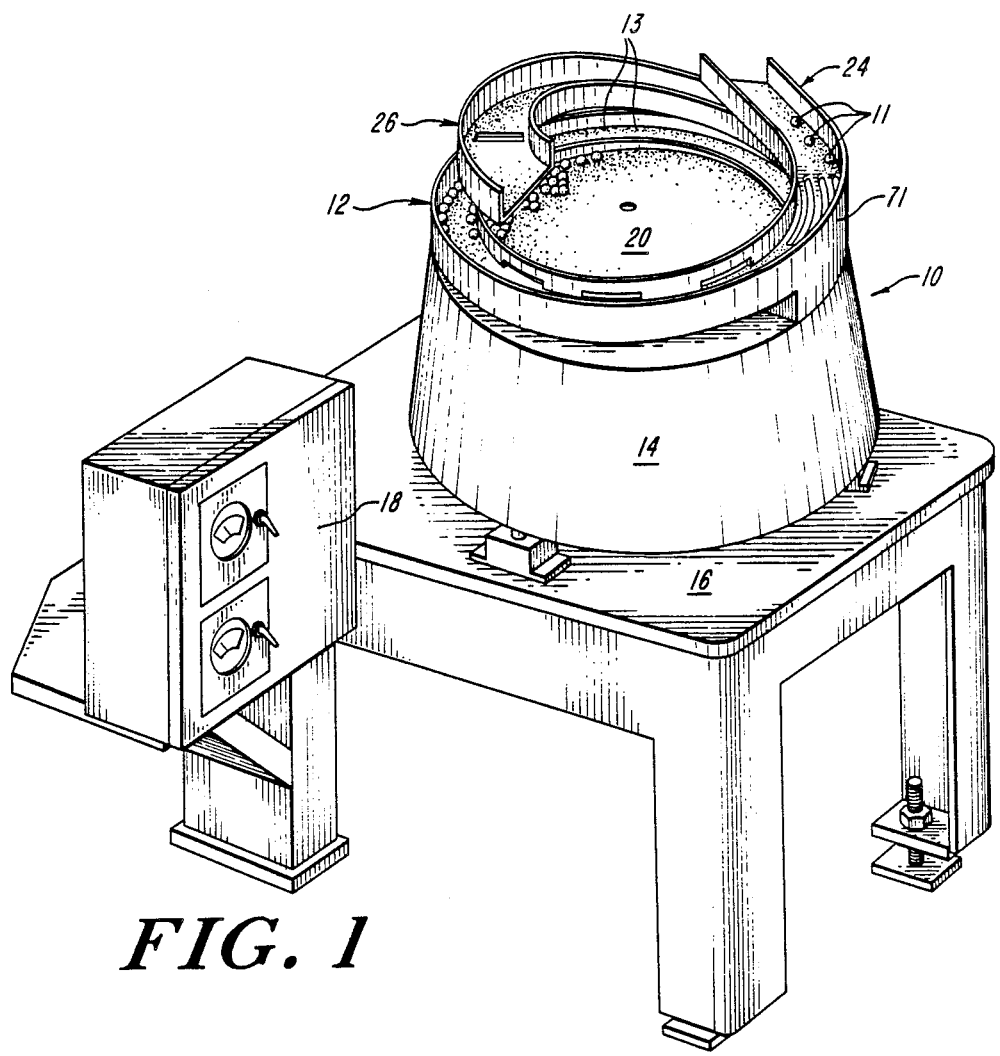
FIG. 1 is a perspective view of a vibratory coating apparatus of the present invention comprising a feed bowl mounted upon a vibratory drive assembly.

Referring to FIG. 1, the vibratory coater apparatus 10 of the present invention comprises a coater plate 12 mounted upon a vibratory drive assembly 14. The entire apparatus is preferably of a size small enough to be mounted upon a table top 16 or a like support. A control module 18 may be disposed adjacent the apparatus 10.

Figure 2B:
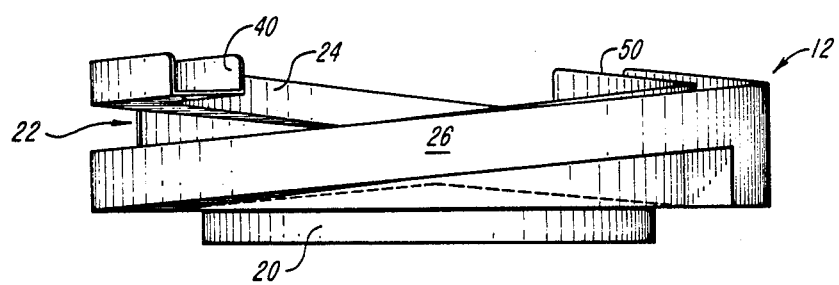
FIG. 2B is a side view of the coater plate of FIG. 2A.
Figure 3:
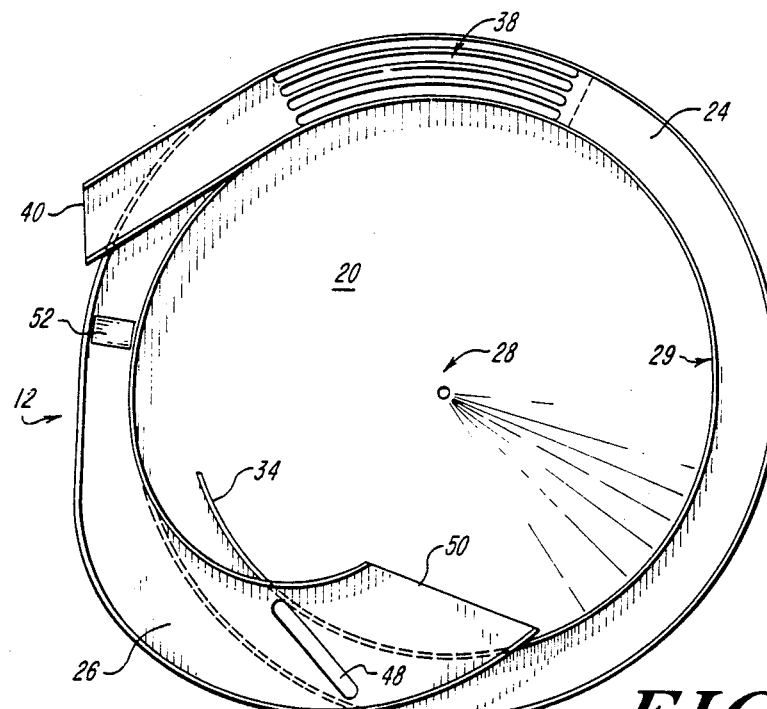
FIG. 3 is a top view of the coater plate of FIG. 2A.

As best shown in FIGS. 2A, 2B and 3, the coater plate 12 of the present invention includes a feed bowl 20 and a ramp system 22. Preferably, the ramp system 22 includes a first ramp 24 and a second ramp 26. Both the first and second ramps are gradually inclined and disposed substantially about the perimeter of the feed bowl 20.

Feed bowl 20 is constructed such that a central portion 28 is slightly more elevated than the outer edges 29 of the feed bowl 20. Preferably, the pitch of the feed bowl, from the center to the outer boundary wall 30, is approximately 2°. The feed bowl also includes an aperture 32 which enables the coater plate 12 to be affixed to the drive assembly 14.

As shown in FIGS. 1 through 3, the first ramp 24 originates within the feed bowl 20 at an outer portion thereof. Wall 34 comprises an inner wall of the first ramp and extends into an interior portion of feed bowl 20. Wall 34 assists in directing coated chocolates 11 and loose coatings 13 into the first ramp. The first ramp 24 extends from its point of origin within the feed bowl 20, substantially about the perimeter of the feed bowl for slightly less than one full revolution. The interior side wall 34 of the first ramp 24 includes a number of spaced apart slots 36. Slots 36 enable loose coatings 13 to be passed off of ramp 24 and back into the feed bowl 20. As noted above, ramp 34 is slightly inclined along it entire length at a substantially constant angle. Preferably, ramp 24 is inclined at an angle of approximately 3° per revolution. In a preferred embodiment, where the first ramp does not complete a full revolution about the feed bowl, the angle of inclination of the ramp 24 is 2.8°.

The first ramp also includes a grate region 38 which is disposed in an end portion of ramp 24 which overlies second ramp 26. The grate system 38 comprises a plurality of slots 37 in the ramp which are large enough to allow loose, non-adhered coatings to drop onto the second ramp, but which are small enough so as to allow coated chocolates to traverse the grate. Preferably, the slots 37 are separated by spaced apart members 39 which have a rounded or cylindrical cross section so as to prevent non-adhered coatings from traversing the grate region 38 upon the members 39. A terminal end 40 of the first ramp is disposed at a location vertically above the feed bowl 20 and slightly beyond the perimeter of bowl 20. The terminal end 40 of first ramp 24 is adapted to allow coated chocolates exiting the coater plate 12 to pass onto a conveyor belt (not shown) or a similar apparatus for conveying the items to downstream processing stations.

The second ramp is also substantiallY disposed about the perimeter of feed bowl 20. The second ramp 26 may originate in an area directly beneath the grate region 38 of first ramp 24. Approximately the first half of ramp 26 is overlapped by an end portion 42 of the first ramp. The second ramp 26 extends about the perimeter of the feed bowl 20 for slightly more than one-half of a revolution. An end portion 44 of the second ramp 26 partially overlaps a beginning section 46 of the first ramp. End portion 44 of the second ramp includes a slot device 48 which is disposed directly over a portion of the first ramp as shown in FIGS. 2A and 3. The slot 48 allows loose coating materials to pass from the second ramp directly onto the first ramp to provide additional coating to chocolates migrating up the first ramp 24. A terminal end 50 of the second ramp extends beyond the inner wall 34 of the first ramp and is positioned directly over an interior portion of feed bowl 20. The positioning of terminal end 50 over the feed bowl 20 enables loose coating materials which do not fall through slot 48 to be returned to the feed bowl.

Figure 4:
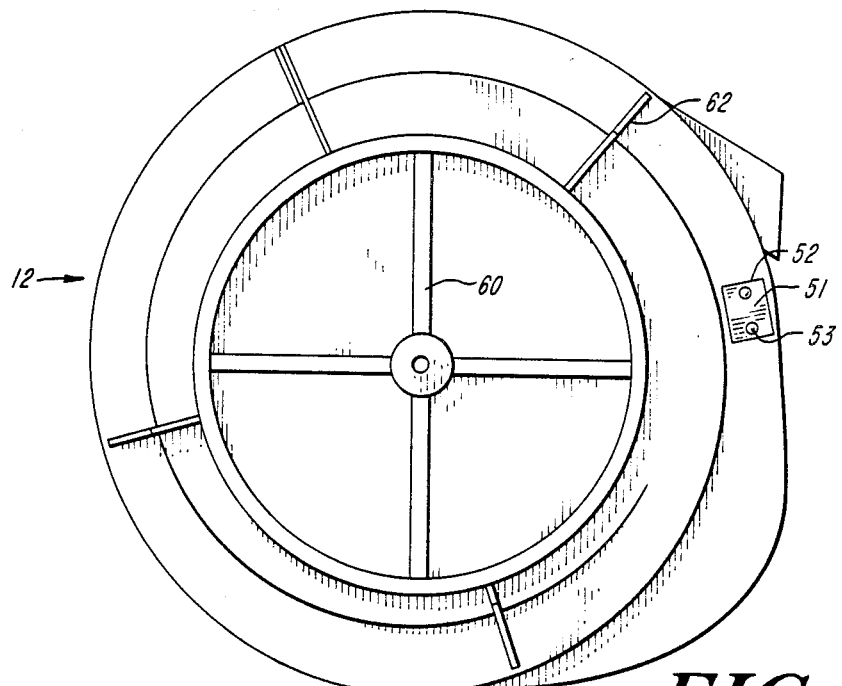
FIG. 4 is a bottom view of the coater plate of FIG. 2A.

In a preferred embodiment, the second ramp 26 may also feature a cleaning port 52, shown in FIGS. 3 and 4. Cleaning port 52 enables the coater plate 12 to be cleaned of loose coating materials upon the completion of a particular coating operation. The cleaning port 52 typically comprises a removable door 51 which is disposed within the second ramp. By removing the bolts 53, or similar fastening devices, the door may be opened and coatings 13 will be removed from the coater plate 12 while the drive assembly 14 is being activated.

Preferably, outer side wall 71, adjacent grate region 38, may be removable in order to facilitate cleaning of second ramp 26.

As illustrated in FIG. 4, the bottom portion of coater plate 12 is reinforced with members 60 and 62.

One of ordinary skill in the art will easily be able to choose the vibratory drive assembly which may be used in connection with the present invention. Typically, any such vibratory drive assembly able to be mounted to the coater plate 12 and able to vibrate at approximately 40 to 150 cycles per second may be used. In a preferred embodiment, a vibratory drive assembly for use with the present invention is Base Unit model no. B-24 available from Parts Feeders, Inc., 87 Thomas Street, East Hartford, Conn.

The dimensions of the coater plate of the present invention will, of course, depend upon the requirements of a particular coating process. One of ordinary skill in the art may easily design a coater plate having appropriate dimensions for a given coating process, upon reading the present disclosure. In one embodiment of the invention, for example, the coater plate may have a diameter of approximately 20 to 30 inches, and preferably about 24 inches. The ramps of the present invention may range in width from about 1 to 3 inches, and preferably about 2 inches. As is apparent from the drawings, the ramps are slightly wider at their terminal ends, and preferably are as wide as about 4 to 6 inches at their terminal ends. In addition, the coater plate may be manufactured of virtually any material able to be used in the food processing industry. Currently preferred materials are stainless steel and teflon coated aluminum.

In a preferred embodiment, the vibratory coater apparatus of the present invention may be utilized in connection with a manufacturing line for candies such as chocolate pieces. By way of example, if the coater apparatus is utilized in connection with a manufacturing line for chocolate pieces, feed bowl 20 would receive chocolate coated candies from an upstream location (not shown) by an apparatus such as a conveyor belt. Coating materials which are to coat the chocolates may be separately deposited within the feed bowl as well. Upon activation of the vibratory coater apparatus, the resulting vibration will agitate the coating particles and the chocolate pieces such that the chocolate will become covered with the coating materials. The vibration will also cause both the chocolate pieces and the coating materials to migrate toward the outer edges of the feed bowl 20. Both the chocolate pieces and the coating materials will enter the first ramp 24 at its origin within feed bowl 20. Next, these materials will migrate up the first ramp and around the perimeter of the coater plate 12. At grate region 38 the chocolate pieces, being substantially greater in size than the coating materials, will successfully traverse the grate and exit the coater apparatus at the terminal end 40 of the first ramp. Upon exiting the coater apparatus, the coated chocolate pieces may, for example, be deposited upon another conveyor assembly (not shown) for transport to downstream processing stations.

The dwell time within the coater plate of any given chocolate piece, or other article to be coated is approximately 5 to 6 seconds. It is desirable to have such a short dwell time because articles such as chocolate pieces may deform if they remain within the coater apparatus even for as little as 20 seconds.

At grate region 38, the coating materials will fall through slots 37 and pass onto the second ramp 26 as they are of too small a size to traverse the grate. Upon becoming deposited on the second ramp the coating materials proceed up the second ramp until reaching slot 48. At slot 48 a substantial number of the coating materials will pass through the slot 48 and drop onto the first ramp to become adhered to top portions of the chocolate pieces passing under slot 48 on ramp 24. Those coating materials which do not drop through slot 48 will proceed to the terminal end 50 of the second ramp and become redeposited within the feeder bowl 20.

When a coating operation is completed, the door 51 to cleaning port 52 may be removed. As vibration continues, the chocolate pieces will eventually exit the coater apparatus through the terminal end 54 of the first ramp. Also, the loose coating materials will eventually pass through cleaning port 52 and may be collected in a suitable receptacle (not shown).

It is understood that certain aspects of the invention described above may be modified by one of ordinary skill in the art without departing from the scope of the invention. For example, the dimensions and angles of inclination of the ramp system may be increased or decreased without adversely affecting the performance of the apparatus.

What is claimed is:

1. An apparatus for coating articles with a coating material, comprising:
   a bowl means for facilitating the coating of articles with the coating material, said bowl means adapted to be affixed to a vibratory drive assembly;
   a first inclined ramp means, originating at the bottom surface of the bowl means, for conveying articles from the bottom surface of the bowl means to a location outside of the bowl means, said first ramp means being disposed substantially about the perimeter of the bowl means; and
   a second inclined ramp means, separate from said first ramp means, for receiving loose coating material from a downstream location of the first ramp means and redepositing the coating material both at an upstream location of the first ramp means separate from the bowl means and within the bowl means.

2. The apparatus of claim 1, wherein said ramp means have a pitch of approximately 3° per revolution.

3. The apparatus of claim 2, wherein the first ramp means extends about the perimeter of the bowl means for slightly less than one full revolution.

4. The apparatus of claim 3, wherein the pitch of the first ramp means is 2.8°.

5. The apparatus of claim 4, wherein the first ramp means originates within an interior portion of the bowl, at an outside edge thereof.

6. The apparatus of claim 5, wherein the first ramp means terminates beyond the perimeter of the bowl means and the terminal end of the first ramp means is disposed at a location vertically above the bottom surface of the bowl.

7. The apparatus of claim 6, wherein the first ramp means includes a plurality of slot means disposed in an interior side wall of the first ramp means for communicating loose coating materials from the first ramp means into the bowl means.

8. The apparatus of claim 7, wherein the first ramp means includes a grate means, disposed over said second ramp means, for allowing loose coating materials to be communicated to the second ramp while allowing coated articles to traverse the grate means.

9. The apparatus of claim 7, wherein the grate means is formed of slots bounded by rounded, elongate members.

10. The apparatus of claim 7, wherein the second ramp originates at a location below the grate means of the first ramp and terminates at a location above the interior of the bowl means.

11. The apparatus of claim 10, wherein said second ramp means extends about the perimeter of the bowl means for approximately one-half revolution.

12. The apparatus of claim 11, wherein the second ramp means is disposed so as to partially overlap and to be partially overlapped by the first ramp means.

13. The apparatus of claim 12, wherein the second ramp means has a slot means for communicating non-adhered coating materials onto the first ramp means, said slot means being positioned slightly inward of the terminal end of the second ramp means, said slot means being disposed directly over a portion of the first ramp means.

14. The apparatus of claim 13, wherein the bowl means is attached to a vibratory drive means for vibrating the bowl means at a frequency of approximately 40–150 cycles per second.

15. The apparatus of claim 13, wherein the bowl means is secured to a vibratory drive assembly means for vibrating the bowl means at approximately 60 cycles per second.

16. The apparatus of claim 13, wherein the articles to be coated are candy pieces.

17. The apparatus of claim 16, wherein the coating materials are selected from the group consisting essentially of nuts, jimmies and coconut shavings.

* * * * *

UNITED STATES PATENT AND TRADEMARK OFFICE
CERTIFICATE OF CORRECTION

PATENT NO. : 4,981,101

DATED : January 1, 1991

INVENTOR(S) : Cataldo et al.

It is certified that error appears in the above-identified patent and that said Letters Patent is hereby corrected as shown below:

Column 1, line 26, please replace "crating" with --coating--.

Column 3, line 7, after "enable" please insert --loose,--.

Column 3, line 33, please replace "substantiallY" with --substantially--.

Signed and Sealed this

Sixth Day of October, 1992

Attest:

DOUGLAS B. COMER

*Attesting Officer*        *Acting Commissioner of Patents and Trademarks*